Patented Jan. 8, 1952

2,581,383

UNITED STATES PATENT OFFICE 2,581,383

HETEROCYCLIC QUATERNARY AMMONIUM DERIVATIVES OF ALPHA-HALOGEN CARBOXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948, Serial No. 65,083

13 Claims. (Cl. 260—53)

The present invention is concerned with certain new chemical products, compounds or compositions which have useful application in various arts. This invention is a continuation-in-part of our copending application Serial No. 726,206, filed February 3, 1947, and now abandoned. It includes methods or procedures for manufacturing said new chemical products, compounds, or compositions, as well as the products, compounds or compositions themselves. Said new compounds or compositions are quaternary ammonium compounds obtained by reaction between a heterocyclic compound of the pyridine series, consisting of pyridine, quinoline, isoquinoline and carbon-linked methyl homologues thereof, and the ester of an alpha-halogen monocarboxylic acid having not over 6 carbon atoms. Specifically, the esters just referred to, being the reactants for combination with the tertiary amino-compound, are hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

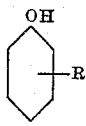

in which R is a hydrocarbon radical having at least 4 and not more than 12 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxy-propylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 65,082, filed December 13, 1948, now Patent 2,542,001, granted February 20, 1951. The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

The oxyalkylated resins, used to provide the alcoholic radical of the alpha-halogen monocarboxylic acid esters converted to the new quaternary ammonium compounds of the invention are described in our Patent 2,499,370, granted March 7, 1950, and the alpha-halogen monocarboxylic acid esters which are converted to the quaternary ammonium compounds of the invention, as well as the oxyalkylated resins, are described in our Patent 2,542,001, granted February 20, 1951, and reference is made to these patents for description of the phenol-aldehyde resins used and their oxyalkylation and conversion to alpha-halogen monocarboxylic acid esters. For specific examples of the resins, reference is made to examples 1a through 103a of Patent 2,499,370. For examples of their oxyalkylation, reference is made to tables which appear at columns 31 through 46 of Patent 2,542,001. For examples of the esters of these oxyalkylated resins with alpha-halogen monocarboxy acids, reference is made to Examples 1c through 39c of Patent 2,542,001.

The thermoplastic resins employed as raw materials are hard, brittle, resins, varying in color from a pale pink to a dark amber. The oxyalkylated resins derived from the thermoplastic resins vary from resinous or sub-resinous materials to thick oils or wax-like bodies. The color, as a result of the next reaction, is apt to be much darker in appearance, varying from honey color to a deep brown or amber. Such oil or sub-resinous materials are then reacted with amines of the kind described, by simply heating to approximately 135° to 165° C. for approximately 2 to 8 hours. Further data are inclined subsequently with regard to temperature and time of reaction. Often the reaction is complete within as little as a half an hour and may be complete at an even lower temperature than the one suggested. The reaction involved, ignoring side reaction, may be illustrated as follows:

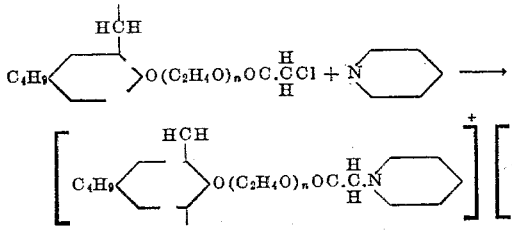

Having obtained the halogenated acid ester, such as the chloroacetic acid ester of the kind previously described and the hydroxylated high molal amine, as specified, all that is required is to react the products so as to form a quaternary ammonium compound, all of which may be illustrated by the following examples:

Example 1d

The chlorine-containing reactant employed was an ester identified as Example 10c of Patent 2,542,001. 400 grams of this xylene-containing ester were mixed with an equimolar amount of pyridine, i. e., 12.8 grams, and the product refluxed at the boiling point of xylene (140° to 150° C.) for 2 to 4 hours. Prior to refluxing, an amount of xylene approximately equal to one-fourth the tertiary amine, was added. In this instance it was 5 grams.

Although in the instant experiment, and those subsequently noted, the solvent employed was xylene, one may employ cymene or decalin. The reaction takes place at comparatively low temperature, as previously suggested, and, in any event, under 215° C., and frequently as low as 120° C. A convenient temperature of reaction is 140° to 160° C. Thus, if xylene is employed, as is our preference, and if there is present at least 25%, by weight, of the combined reactants in the form of xylene, there is the automatic effect in regard to the temperature, and the xylene may be permitted to remain after the reaction is complete. If desired, it may be eliminated in any convenient manner, such as distillation or vacuum distillation. In all cases we have used a time period of 2 to 4 hours and found the reaction was complete at the end of the 4-hour period. In some cases we believe the reaction was complete in 30 to 45 minutes. In this particular reaction, and in most of the subsequent reactions, we have attempted to have sufficient xylene present, adding more, if need be, so the final reaction product contains approximately 45% xylene and 55% quaternary compound. A solution of this concentration is usually free from any highly viscous or tacky properties, and is convenient for use in a pump, which is particularly desirable when used as a demulsifier. The final product obtained was amber in color, water-soluble, and contained 46.5% xylene.

Example 2d

The same procedure was followed as in Example 1d, preceding, except that 250 grams of the ester identified as 15c of Patent 2,542,001 were reacted with 10 grams of alpha-picoline. The final product was a deep amber-colored liquid, fairly water-soluble, and contained 47% xylene.

Example 3d

The same procedure was followed as in Example 1d, preceding, except that 400 grams of the ester identified as 13c of Patent 2,542,001 were reacted with 19.5 grams of pyridine. The final product was an amber-colored, water-soluble liquid, containing 52.5% xylene.

Example 4d

The same procedure was followed as in Example 1d, preceding, except that 400 grams of the ester identified as 14c of Patent 2,542,001 were reacted with 15.9 grams of pyridine. The final product was an amber-colored, water-soluble liquid, containing 50% xylene.

Example 5d

The same procedure was followed as in Example 1d, preceding, except that 400 grams of the ester identified as 8c of Patent 2,542,001 were reacted with 19.6 grams of pyridine. The final product was an amber-colored, water-emulsifiable liquid, containing 49.5% xylene.

Example 6d

The same procedure was followed as in Example 1d, preceding, except that 400 grams of the ester identified as 9c of Patent 2,542,001 were reacted with 15.9 grams of pyridine. The final product was an amber-colored, water-emulsifiable liquid, containing 48.4% xylene.

Example 7d

The same procedure was followed as in Example 1d, preceding, except that 400 grams of the ester identified as 2c of Patent 2,542,001 were reacted with 26 grams of pyridine. The final product was an amber-colored, water-soluble liquid, containing 55% xylene.

Example 8d

The same procedure was followed as in Example 1d, preceding, except that 400 grams of the ester identified as 12c of Patent 2,542,001 were reacted with 22 grams of pyridine. The final product was an amber-colored, water-soluble liquid, containing 59.5% xylene.

Example 9d

The same procedure was followed as in Example 1d, preceding, except that 400 grams of the ester identified as 19c of Patent 2,542,001 were reacted with 16 grams of pyridine. The final product was a deep amber-colored, very water-soluble liquid, containing 47.5% xylene.

Example 10d

The same procedure was followed as in Example 1d, preceding, except that 400 grams of the ester identified as 18c of Patent 2,542,001 were reacted with 19.7 grams of pyridine. The final product was a deep amber-colored, somewhat viscous, water-soluble liquid, containing 48.7% xylene.

Example 11d

The same procedure was followed as in Example 1d, preceding, except that 400 grams of the ester identified as 20c of Patent 2,542,001 were reacted with 13.6 grams of pyridine. The final product was a deep amber-colored, water-emulsifiable liquid, containing 46% xylene.

Example 12d

The same procedure was followed as in Example 1d, preceding, except that 400 grams of the ester identified as 3c of Patent 2,542,001 were reacted with 16.8 grams of pyridine. The final product was an amber-colored, water-soluble liquid, containing 47% xylene.

Example 13d

The same procedure was followed as in Example 1d, preceding, except that 400 grams of the ester identified as 4c of Patent 2,542,001 were reacted with 18.2 grams of pyridine. The final product was a deep amber-colored, slightly cloudy, water-soluble liquid, containing 45% xylene.

Example 14d

The same procedure was followed as in Example 1d, preceding, except that 400 grams of the ester identified as 5c of Patent 2,542,001 were reacted with 15.2 grams of pyridine. The final product was a deep amber-colored, slightly cloudy, water-soluble liquid, containing 44.5% xylene.

Example 15d

The same procedure was followed as in Example 1d, preceding, except that 400 grams of the ester identified as 23c of Patent 2,542,001 were reacted with 22.8 grams of pyridine. The final product was a deep amber-colored, water-soluble liquid, containing 43% xylene.

Example 16d

The same procedure was followed as in Example 1d, preceding, except that 400 grams of the ester identified as 24c of Patent 2,542,001 were reacted with 22.5 grams of alpha-picoline. The final product was a deep amber-colored, water-soluble liquid containing 43% xylene.

Example 17d

The same procedure was followed as in Example 1d, preceding, except that 400 grams of the ester identified as 25c of Patent 2,542,001 were reacted with 17.3 grams of alpha-picoline. The final product was a deep amber-colored, water-soluble, slightly cloudy liquid, containing 42.5% xylene.

Having thus described our invention, what we claim as new and desire to secure by Letters Patent is:

1. A quaternary ammonium compound obtained by reaction between a heterocylic compound of the pyridine series consisting of pyridine, quinoline, isoquinoline, and carbon-linked methyl homologues thereof, and an ester in which the acyl radical is that of an alpha-halogen monocarboxylic acid having not over 6 carbon atoms and composed of carbon, hydrogen, oxygen and halogen and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenolaldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

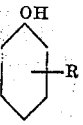

in which R is a hydrocarbon radical having at least 4 and not more than 12 carbon atoms and substituted in one of the positions ortho and para; said oxyalklated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A quaternary ammonium compound obtained by reaction between a heterocyclic compound of the pyridine series consisting of pyridine, quinoline, isoquinoline, and carbon-linked methyl homologues thereof, and a chloroacetate of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble phenolaldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

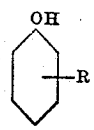

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ultimate quaternary ammonium compound as well as the oxyalkylated resin in an equal weight of xylene are sufficient to produce an emulsion when said xylene solution is shaken vigorously with one to three volumes of water.

3. A quaternary ammonium compound obtained by reaction between a heterocyclic compound of the pyridine series consisting of pyridine, quinoline, isoquinoline, and carbon-linked methyl homologues thereof, and a chloroacetate of certain hydrophile polyhydric synthetic products; said hydrophile synthetic products being oxyethylation products of (A) ethylene oxide; and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

4. A quaternary ammonium compound obtained by reaction between pyridine and chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble, low-stage, phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

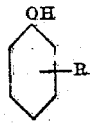

in which R is an aliphatic hydrocarbon radical having at least 4 and not over 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

5. A quaternary ammonium compound obtained by reaction between pyridine and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble, low-stage, acid-catalyzed phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

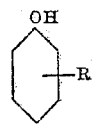

in which R is an aliphatic hydrocarbon radical having at least 4 and not over 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

6. The product of claim 4, wherein R is substituted in the para position.

7. The product of claim 4, wherein R is a butyl radical substituted in the para position.

8. The product of claim 4, wherein R is an amyl radical substituted in the para position.

9. The product of claim 4, wherein R is a nonyl radical substituted in the para position.

10. The product of claim 5, wherein R is substituted in the para position.

11. The product of claim 5, wherein R is a butyl radical substituted in the para position.

12. The product of claim 5, wherein R is an amyl radical substituted in the para position.

13. The product of claim 5, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,499,365 | De Groote | Mar. 7, 1950 |